US006316586B1

(12) United States Patent
Sunkara et al.

(10) Patent No.: US 6,316,586 B1
(45) Date of Patent: Nov. 13, 2001

(54) COPOLYETHER COMPOSITION AND PROCESSES THEREFOR AND THEREWITH

(75) Inventors: Hari Babu Sunkara; Yali Yang, both of Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/638,356

(22) Filed: Aug. 15, 2000

(51) Int. Cl.$^7$ .................................................. C08G 63/66
(52) U.S. Cl. ...................... 528/300; 528/295; 528/298; 528/301; 528/302; 528/307; 528/308; 528/308.6; 525/437; 525/444
(58) Field of Search ..................... 528/295, 300, 528/298, 301, 302, 307, 308, 308.6; 525/437, 444

(56) References Cited

U.S. PATENT DOCUMENTS

| | | |
|---|---|---|
| 2,520,733 | 8/1950 | Morris et al. .................. 260/615 |
| 2,657,233 | 10/1953 | Carnahan ...................... 260/544 |
| 4,611,049 | 9/1986 | Kuratsuji et al. .............. 5228/279 |
| 5,097,004 | 3/1992 | Gallagher et al. . |
| 5,559,205 | 9/1996 | Hansen et al. . |
| 6,075,115 | 6/2000 | Putzig et al. . |

FOREIGN PATENT DOCUMENTS

| | | |
|---|---|---|
| 0 847 960 A1 | 6/1998 | (EP) . |
| 1 006 220 | 6/2000 | (EP) . |
| 11-29630 | 5/1989 | (JP) . |
| 11-29685 | 5/1989 | (JP) . |
| 11-29763 | 5/1989 | (JP) . |
| 7-209811 | 8/1995 | (JP) . |
| 9-40855 | 2/1997 | (JP) . |
| 9-59601 | 3/1997 | (JP) . |
| 9-249742 | 9/1997 | (JP) . |
| 10-287740 | 10/1998 | (JP) . |
| 11-100722 | 4/1999 | (JP) . |
| 11-287790 | 10/1999 | (JP) . |
| WO 99/09238 A1 | 2/1999 | (WO) . |
| WO 00/26301 A1 | 5/2000 | (WO) . |

OTHER PUBLICATIONS

Chemical Fibers International, vol. 48, Dec. 1998, pp. 508–513.
Datye, Colourage, Feb. 1994, pp. 7–12.

*Primary Examiner*—Samuel A. Acquah

(57) ABSTRACT

A copolyether composition that can be used to produce a dyeable polyester is provided. The composition can comprise repeat units derived from a first diol such as, for example, 1,3-propanediol and a sulfonated dicarboxylic acid such as, for example, 5-sulfo-isophthalic acid. The dyeable polyester composition can comprise repeat units derived from the copolyether composition, an acid such as, for example, terephthalic acid, and a second diol such as, for example, 1,3-propanediol. Also disclosed is a process that can be used for producing the copolyether composition. The process comprises contacting the first diol with the sulfonated dicarboxylic acid. Further disclosed is a process that can be used for producing the dyeable composition in which the process comprises (1) contacting, in the presence of a catalyst, the copolyether composition with a diol such as, for example, 1,3-propanediol, and a dicarboxylic ester such as, for example, dimethylterephthalate or (2) contacting an acid such as for example, terephthalic acid and a diol such as, for example, 1,3-propanediol to produce an intermediate and thereafter contacting the intermediate with the copolyether.

23 Claims, No Drawings

COPOLYETHER COMPOSITION AND PROCESSES THEREFOR AND THEREWITH

FIELD OF THE INVENTION

The present invention relates to a copolyether composition comprising repeat units derived from sulfonated dicarboxylic acid, a process therefor, and a process therewith.

BACKGROUND OF THE INVENTION

Polyesters, especially polyalkylene terephthalates, have excellent physical and chemical properties and have been widely used for resins, films and fibers. For example, polyester fibers have relatively high melting points and can attain high orientation and crystallinity. Accordingly, polyesters have excellent fiber properties such as chemical, heat and light stability, and high strength.

However, polyesters, especially polyester fibers, are difficult to dye. The molecular structure and the high levels of orientation and crystallinity that impart desirable properties to the polyester also contribute to a resistance to coloration by dye compounds. Also contributing to the difficulty in dyeing polyester is the absence in polyesters of ionic dye sites, in contrast to protein fibers, for instance.

In order to make a polyester dyeable by cationic or basic dyes, the polyester must be modified by incorporating dye sites. The most common method to incorporate such sites is polymerization in the presence of either a dimethyl ester or a bis-ethylene glycol ester of 5-sodium sulfoisophthalic acid. The bis-ethylene glycol ester of 5-sulfoisophthalic acid is generally prepared by transesterification of the dimethyl ester of the sodium salt of 5-sulfoisophthalic acid using excess ethylene glycol at 160–250° C. and an ester interchange catalyst. U.S. Pat. Nos. 3,936,389 and 5,607,765 disclose the preparation and utility of bis-ethylene glycol ester of 5-sulfoisophthalic acid in modified polyesters. U.S. Pat. No. 3,936,389 discloses that a mole of the dimethyl ester of a metallo sulfodicarboxylic acid reacts with up to 30 mole equivalents of ethylene glycol, but only 2 moles of the glycol actually react, the remaining glycol acts solely as a solvent for the product. U.S. Pat. No. 3,900,527 discloses the preparation of a bisglycol ester of 5-sulfo isophthalic acid, sodium salt for incorporation into polyesters to improve dyeability and affinity for basic dyes.

U.S. Pat. No. 4,665,153 and JP 10287814 also disclose the preparation of a copolyester by reacting together a dicarboxylic acid, a glycol, a metal sulfonate, and a polyether glycol. The distribution of the monomers in such products is essentially random.

The melt viscosities of the copolyesters are substantially increased as the amount of sulfonate salts rises, resulting in low molecular weight polymers and difficulties in spinning process. It is known that polyether glycols, when used as a block comonomer, yield polyesters with lower melt viscosities and, therefore, can be added along with sulfonate salts during polymerization process to offset the high melt viscosities. Datye, in Colourage, 7–12, February 1994, and Gries et al., in Chemical Fibers International, Vol. 48, 508–513, December 1998, disclose incorporation of additives into polyesters. The polyether glycols are generally obtained by ring opening polymerization of cyclic ethers. The most common polyether glycols that are being used are poly(ethylene glycol), poly(1,2-propylene glycol) and poly(tetramethylene glycol).

It is therefore desirable to develop a composition that can be used to produce ether esters that improve the dyeability of polyesters and a process for producing the composition. An advantage of the invention is that the need to separately make the bis-glycol ester of sulfoisophthalic acid, or salt thereof, and the polyether glycol can be eliminated. Another advantage of the invention is that the preparation of ionic polyether glycols can be carried out in a single step.

SUMMARY OF THE INVENTION

According to a first embodiment of the invention, a copolyether composition that can be used to produce a dyeable polyester is provided. The composition comprises repeat units derived from a first diol and a sulfonated dicarboxylic acid.

According to a second embodiment of the invention, a process that can be used for producing the first composition is provided. The process comprises contacting a first diol with a sulfonated dicarboxylic acid in which the first diol is the same as that disclosed above.

According to a third embodiment of the invention, a process that can be used for producing the copolyester composition is provided. The process comprises contacting, in the presence of a catalyst, the copolyether composition disclosed in the first embodiment of the invention with (1) a second diol and at least one acid or (2) the product derived from a second diol and at least one acid wherein the acid is a dicarboxylic, ester thereof, or combinations thereof.

According to a fourth embodiment of the invention, a copolyester composition is provided that comprises repeat units derived from the copolyether composition, a second diol and at least one acid which is a dicarboxylic, ester, or combinations thereof.

DETAILED DESCRIPTION OF THE INVENTION

The copolyether composition of the first embodiment of the invention is a polymer derived from a sulfonated dicarboxylic acid having the formula of:

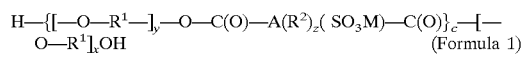

$$\text{H}-\{[-O-R^1-]_y-O-C(O)-A(R^2)_z(SO_3M)-C(O)\}_c-[-O-R^1]_xOH \quad \text{(Formula 1)}$$

wherein A is a hydrocarbyl group having about 1 to about 20 carbon atoms per group. The hydrocarbyl group can be (1) a monocyclic or bicyclic aromatic nucleus, or (2) a branched or straight chain, saturated or unsaturated. The hydrocarbyl group can be substituted with one or more $R^2$, where $R^2$ is a $C_1$ to $C_4$ alkyl group and z is 0–2, inclusive, except that, when A is aliphatic, z is 0. $R^1$ is selected from the group comprising a straight chain $C_3$ or $C_6$–$C_{12}$ alkylene group, $-CH_2-CH_{(2-n)}(CH_3)_n-CH_2-$, or $-(CH_2)_3-O-(CH_2)_3-$. M is hydrogen, an alkali metal, an alkaline earth metal, quaternary ammonium or phosphonium, or combinations of two or more thereof. Additionally, n is 1 or 2, x and y are each more than 1 and (x+y) is 4 to 50, and c is 2 to 10 or a mixture of a copolyether with c=1 with one or more copolyether having c=2–10. Finally, x, y, and c are each a number that produces the number-average molecular weight of said copolyether within the range of about 500–10,000 and more preferably within the range of 500–4,000. For spinnable polyesters for use as fibers, a molecular weight range of 500–2,000 is most preferred. For polymers having increased water solubility, the higher ranges are generally preferred.

The first diol can be a straight chain diol having 3 or 6 to 12 carbon atoms per molecule, $HO-CH_2-CH_{(2-n)}$ $(CH_3)_n$—$CH_2$—OH, or HO—$(CH_2)_3$—O—$(CH_2)_3$—OH, or combinations of two or more thereof. Preferably it is an α,ω-alkane diol. A $C_2$, $C_4$, or $C_5$ α,ω-alkane diol tends to yield cyclic ethers rather than a chain structure disclosed above.

Examples of suitable first diols include, but are not limited to, 1, 3-propanediol, 1,6-hexanediol, 1,8-octanediol, 1,10-decanediol, 1,12-dodecanediol, 2-methyl- and 2,2-dimethyl-1,3-propanediols, di(1,3-propylene glycol) (DPG), or combinations of two or more thereof. The preferred first diol is 1,3-propanediol because the copolyether produced therefrom can be used to produce desirable dyeable polyester.

The term "sulfonated dicarboxylic acid" refers to, unless otherwise indicated, either aliphatic sulfonated dicarboxylic acid, aromatic sulfonated dicarboxylic acid, salt thereof, esters thereof, or combinations of two or more thereof. The salt can be an ammonium salt, an alkali metal salt, an alkaline earth metal salt, a phosphonium salt, or combinations of two or more thereof.

Examples of suitable aliphatic sulfonated dicarboxylic acids include, but are not limited to, sulfosuccinic acid, 3-(2-sulfoethyl)hexanedioic acid, and salts thereof Examples of suitable aromatic sulfonated dicarboxylic acids include, but are not limited to, sulfonated phthalic acid, sulfonated isophthalic acid, sulfonated terephthalic acids, sulfonated naphthalene dicarboxylic acids, salts thereof, esters thereof, and combinations of two or more thereof The preferred sulfonated dicarboxylic acid is 5-sulfo-isophthalic acid, or a combination of the acid and its salt such as 5-sulfo-isophthalic acid sodium salt, for they are useful as comonomer for producing a dyeable polyester. Esters thereof are less preferred.

The molar ratio of the repeat units derived from sulfonated dicarboxylic acid to the repeat units derived from first diol can be any ratio so long as the ratio can produce the copolyether disclosed herein. The preferred ratio is in the range of from about 1:5 to about 1:100, more preferably 1:10 to 1:60.

The copolyether composition can be produced by any methods known to one skilled in the art. However, it is preferably produced by the process disclosed in the second embodiment of the invention.

According to the second embodiment of the invention, the contacting of the first diol and sulfonated dicarboxylic acid can be carried out under any condition effective to the production of the first composition. The first diol and sulfonated dicarboxylic acid are the same as those disclosed above. The condition can include a temperature in the range of from about 140° C. to about 210° C., preferably 160° C. to 190° C. and a pressure sufficient to contain the reactants.

Generally, the first diol can be contacted, preferably in the presence of an inert gas, with (case 1) a sulfonated dicarboxylic acid or (case 2) a mixture of a sulfonated dicarboxylic acid and its salt or (case 3) the sulfonated dicarboxylic acid salt. Any inert gas can be used. Nitrogen is the preferred inert gas for its low cost. In case (3) an acid catalyst as described below is preferably present in the process. Optionally, Lewis acid catalysts can be used. The sulfonic acid and solid acid catalysts such as perfluorinated ion exchange polymers act as both dehydration and esterification catlysts. The Lewis acids act as esterification catalysts.

The contacting of a first diol and the sulfonated dicarboxylic acid can be carried out in the presence of an acid catalyst. In cases 1 and 2, the catalyst can firstly be provided by insuring that at least 1 weight % of the sulfonated dicarboxylic acid is present as the sulfonic acid. The remainder, up to 99 weight %, can be present as the salt of the sulfonic acid, preferred salts are sodium and lithium. In cases 1 and 2, the use of a Lewis acid catalyst is optional. Alternatively, in case 3 involving the absence of a sulfonic acid, a solid or heterogeneous acid catalyst provides the catalytic function, again with the Lewis acid an option. Suitable solid or heterogeneous acid catalysts include perfluorinated ion-exchange polymers containing pendant sulfonic acid groups. The preferred heterogeneous acid catalyst is a perfluorinated ion-exchange polymer (PFIEP), available for instance as NAFION® perfluorinated ion-exchange polymers from E. I. du Pont de Nemours & Co., Wilmington, Del.). The amount of the Lewis acid catalyst used can be <100 ppmw (parts per million by weight), and removal of the catalyst from the product is optional. The amount of PFIEP used can be 5–10 weight percent, and the PFIEP can be readily removed from the reaction product by, for instance, filtration.

During the contacting, water is formed and can be removed in the nitrogen stream or under vacuum, e.g., 1–10 mm Hg (130–1330 Pa) to drive to complete production of the copolyether. Any volatile byproducts can be similarly removed. When the molecular weight of the copolyether reaches about 500 to about 2,000, the contacting can be stopped and the product can be recovered.

The process of the second embodiment of the invention can be carried out in the presence or absence of a solvent. If a solvent is not necessary to facilitate the production of the copolyether, it is preferred that the process is carried out in the absence of a solvent.

The initial product produced by contacting the first diol with the sulfonated dicarboxylic acid is generally acidic and can be treated with sufficient base to yield the salt of the copolyether of the invention. Any base can be used. The preferred base is an alkali metal methoxide in methanol.

According to the third embodiment of the invention, the copolyether is used as a comonomer for the production of polyesters, providing both ionomeric groups and soft segments to the final polymer. If the copolyether is used as a comonomer for producing a dyeable polyester, the acidity of the sulfonic acid product is preferably reduced to minimize dehydration of diol comonomer, particularly the 1,3-propanediol. However, excess alkali metal methoxide is also preferably avoided. The amount of alkali metal methoxide is therefore preferably between 95 to 105, more preferably 100 to 100.5% of the stoichiometric amount based on the acid number of the copolyether. The copolyether of this invention can be used without further purification.

The third embodiment of the invention comprises contacting, in the presence of a catalyst, the copolyether of this invention with a second diol and at least one acid which is a dicarboxylic acid, ester thereof, or combinations thereof under a condition sufficient to effect the production of a dyeable polyester.

Generally, any diol that can be used to produce an ester or polyester can be used as second diol. Suitable second diols can contain 2 to 12 carbon atoms per molecule. Examples of suitable second diols can include, but are not limited to, ethanediol, 1,3-propanediol, 1,4-butanediol, 1,4-cyclohexanedimethanol, or combinations of two or more thereof The preferred second diol is 1, 3-propanediol.

Any dicarboxylic acid, which can be contacted with the second diol to produce an ester, can be used. Generally, such dicarboxylic acids include, but are not limited to, acids, esters, oligomers, or polymers having repeat units derived from an acid, or combinations of two or more thereof.

The presently preferred acid has the formula of $HO_2C$—$A^1$—$CO_2H$ in which $A^1$ is preferably an arylene group.

Examples of suitable acids include, but are not limited to, terephthalic acid, isophthalic acid, phthalic acid, naphthalene dicarboxylic acid, 4,4'-diphenylene dicarboxylic acids, their esters, and combinations of two or more thereof The presently preferred acid is terephthalic acid, its esters such as dimethyl terephthalate, or combinations thereof because the polyesters produced therefrom have a wide range of industrial applications. Other alkylene dibasic acids include succinic and adipic acids and their esters.

The polyester can be synthesized in two stages as shown in Reactions 1 and 2 below. The first stage encompasses transesterification (when using a dimethyl ester) or esterification (when using the dicarboxylic acid itself). The second stage encompasses polycondensation during which the polymer molecular weight is optimized. Suitable conditions to effect the transesterification stage can include a temperature in the range of from about 150° C. to about 300° C., preferably about 170° C. to about 230° C., under a pressure sufficient to contain the reactants for a time period sufficient to distill off the methanol. For example, a dicarboxylic acid ester, a second diol, the copolyether, and a polymerization catalyst can be heated under an inert gas blanket to drive off the eliminated methanol. Alternatively, the dicarboxylic acid itself can be substituted and the eliminated water driven off.

The polycondensation stage can be effected by heating the mixture produced in the first stage to 240 to 270° C. under vacuum (e.g., 1 mm Hg, 133 Pa) to remove excess low molecular weight diol and produce high molecular weight polyesters. When a dicarboxylic acid ester is used, the copolyether can be added at the beginning, i.e., at the transesterification stage, or after transesterification at the polycondensation stage. However, when a dicarboxylic acid is used, it is preferred to add the copolyether at the polycondensation stage to avoid compromising the desired intrinsic viscosity and molecular weight of the polyester. The copolyethers can be added to batch or continuous polymerization processes in either Reaction 1 or 2, with the acid, the second di ol, and the catalyst. Solid state polymerization, well known to one skilled in the art, can be used to increase further the molecular weight and intrinsic viscosity to a desired range.

Reaction 1

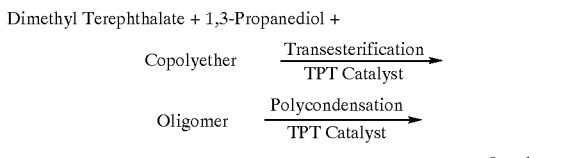

Reaction 2

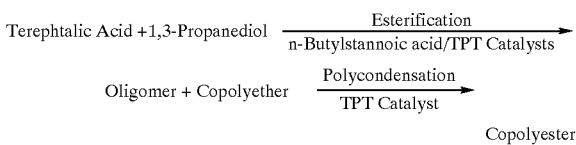

The molar ratio of second diol to dicarboxylic acid or its ester can be any ratio so long as the ratio can effect the production of polyester. Generally slightly more than a 1:1 ratio is used. For example, the ratio can be in the range of from about 1.1:1 to about 2:1, preferably about 1.3:1 to about 1.6:1. Similarly, the molar ratio of second diol to the copolyether can be any ratio as long as the ratio can effect the production of dyeable polyester. Generally the amount of the copolyether used in the preparation of a polyester polymer is an amount sufficient to provide 1 to 4 mole % and preferably 1 to 2 mole% of the sodium salt of sulfonated dicarboxylic acid, and 1 to 10 mole % and preferably 1 to 5 mole % of the copolyether based on the final polyester product.

Any known esterification and transesterification catalysts such as, for example, manganese, cobalt, zinc salts, and/or tetraisopropyl titanate (e.g., TYZOR® TPT, abbreviated "TPT", see Materials below) can be used in Reactions 1 and 2. Catalysts such as n-butylstannoic acid (see Materials below) are preferred for the esterification step in Reaction 2. In the case of reaction 2, the n-butylstannoic acid and the TPT are added sequentially at the esterification and polycondensation steps, or, more conveniently, are both added at the esterification step.

The metal content of the catalyst can be present in the range of about 1 to 1,500 ppmw based on the weight of the final polymer, preferably about 10 to about 1,000 ppmw, and most preferably 10 to 500 ppmw. Other ingredients also can be present to enhance catalyst stability or performance.

The copolyether provides a means for incorporating, in a controlled manner, both a "soft segment" in the polymer chain and an ionomeric group. The combination if such monomer residues in polyester is well known to improve toughness, dyeability with cationic dyes, biodegradability, antibacterial properties, flexibility, higher throughput in fiber and film production, and improved tactile properties such as hand and soft feel of fabrics. Incorporation of the copolyether of this invention into polyesters, provide additional advantages compared with the prior art addition of simple sulfonated dicarboxylic acids or their esters. For instance, the incorporation of 5-sulfoisophthalic acid sodium salt into polyesters to enhance cationic dyeability is characterized by limitations such as high melt viscosity, low intrinsic viscosity, high diether content, poor mechanical properties, and difficulties in spinning the polyester, as described by Datye and Gries et al in the references cited above.

Incorporation of the copolyether of this invention into polyester polymers can result in different segment structures in the final polyester compared with the segment structures obtained using prior art procedures. For example, the bis-glycol esters of 5-sulfo isophthalic acid sodium salt can be prepared according to the method of King and McGee in U.S. Pat. No. 3,900,527. A polyester can be produced using such a prepolymer, e.g., from dimethylterephthalate, a α(ω-alkane diol, and either 5-sulfoisophthalic acid or a 5-sulfoisophthalate pre-esterified with an α,(ω-alkane diol does not contain the sequence:

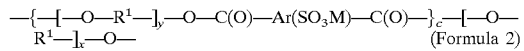

—{—[—O—R$^1$—]$_y$—O—C(O)—Ar(SO$_3$M)—C(O)—}$_c$—[—O—R$^1$—]$_x$—O— (Formula 2)

which is given by the use of the copolyether of Formula 1. The sequence of Formula 2 insures a better distribution of the sulfonic acid groups throughout the polyester chain and enables selective distribution of different α,ω-alkane diols within the polyester chain.

As indicated in the Background of the Invention section, the use of a sulfonic acid alone increases the melt viscosity. In order to maintain melt spinning properties, the molecular weight must thus be lowered, a change that adversely lowers fiber strength. However, using the copolyether of this invention introduces the sodium salt of sulfonic acid without an increase in melt viscosity.

According to the fourth embodiment of the invention, a polyester composition is provided that comprises repeat units derived from the copolyether composition, second diol, and at least one acid as disclosed above.

TEST METHODS

Test Method 1

The number-average molecular weight ($M_n$) values of copolyether were determined conventionally by analyzing end-groups using NMR spectroscopy, by titration, or by gel permeation chromatograph (GPC). $M_w$ is the weight average molecular weight. The GPC method provides both $M_n$ and $M_w$. Polydispersity (the molecular weight distribution) is generally defined by the ratio of $M_w/M_n$ and, for condensation polymers, the polydispersity has a value of about 2.0. The values of $M_w/M_n$ for the copolyesters described in Table 1 are between 1.51–1.79.

Test Method 2

Melting point, crystallization temperature, and glass transition temperature were obtained conventionally for the copolyether and polyesters by differential scanning calorimetry. Melt viscosities for the polyesters were measured using a capillary rheometer (DYNISCO, from Kayeness Polymer Test Systems, Honey Brook Pa.) at 260° C. with a hold time of 5.5 minutes. Melt viscosity units are Pa.s.

Test Method 3

Intrinsic viscosities of the polyesters before and after solid phase polymerization (see Table 1) were measured conventionally. The measurement units are dl/g (100 ml/g).

Test Method 4

The "b*" color values of the polyesters were measured by collecting the reflectance data from 800 to 250 nm using a Varian Cary 5 UV/VIS/NIR Spectrophotometer, operated according to the manufacturer's instructions.

MATERIALS

Sodium salt of 5-sulfoisophthalic acid (NRD®-75) was converted to the acid form, conventionally, using ion exchange techniques; 1,3-propanediol; dimethylterephthalate; terephthalic acid; and TYZOR® TPT (tetra isopropyl titanate) were obtained from E.I. du Pont de Nemours & Co., Wilmington Del.

n-Butylstannoic acid (EUROCAT® 8200) was obtained from Witco Corporation (Hahnville, La.).

EXAMPLES

Example 1

Preparation of Poly(oxytrimethylene-co-5-sulfoisophthalate)glycol

A 250-mL three-necked round-bottom flask was fitted with a stirrer, nitrogen inlet, means of heating and temperature measurement, and a distillation head. The flask was charged with 1,3-propanediol (159.6 g, 2.01 mol) and 5-sulfoisophthalic acid (10.422 g, 42.3 mmol) to produce a mixture. The mixture was swept with nitrogen for 15 minutes with stirring and then heated to 175–190° C. while 39 ml distillate (mainly water) was removed over 2.5 h. The copolyether had melting point 17.4° C., crystallization temperature −11.8° C., $T_g$−70.7° C., and number average molecular weight ($M_n$) of about 670 by gel permeation chromatography (GPC). The acid number of the copolyether product was measured by titration, and the copolyether was neutralized with a stoichiometric amount of standardized sodium methoxide in methanol to yield the corresponding sodium salt, poly(oxytrimethylene-co-5-sulfoisophthalate) glycol, sodium salt.

Example 2

Preparation of a Copolyester of Poly(trimethylene terephlalate)

A 250-mL three-necked flask, was charged with dimethyl terephthalate (97.0 g, 0.5 mol), 1,3-propane diol (57.0 g, 0.75 mol) and tetraisopropyl titanate (TYZOR® TPT, 0.031 g, corresponding to 50 ppmw Ti in the final polymer). The mixture was swept with nitrogen, and heated under a nitrogen stream at 170–210° C. until no further methanol distilled. After transesterification was completed, the copolyether sodium salt, prepared according to Example 1, (17.08 g, corresponding to 5 mole % copolyether and 1 mole % sodium sulfonate based on the polyester) was added to the low molecular weight poly(trimethylene terephthalate). The polymerization step was carried out at 250° C. and under 0.25 mm Hg pressure (33 Pa). The resulting polymer was ground into small particles using a Wiley mill. The copolyester was further polymerized in the solid state at 200° C. for 10 hours, and the physical properties shown in Table 1 were measured by Test Methods 1 to 4.

Examples 3 and 4

For Example 3, the copolyether salt prepared according to Example 1 was incorporated into polyester prepared with dimethylterephthalate as described in Example 2, except that the copolyether salt was added initially at the transesterification stage instead of at the later polycondensation stage.

For Example 4, the copolyether salt prepared according to Example 1 was incorporated into polyester prepared as described in Example 2 except that an equimolar amount of terephthalic acid replaced the dimethylterephthalate. For the terephthalic acid polycondensation in Example 4, n-butylstannoic acid (0.0217 g, corresponding to 120 ppm Sn in the final polyether) was added with the TYZOR® TPT. The resulting polymers were again ground into small particles using a Wiley mill. The copolyesters were further polymerized in the solid state at 200° C. for 9 hours, and the physical properties shown in Table 1 were measured by Test Methods 1 to 4.

Comparative Example A

The polyester of Example 4 was prepared according to the procedure described, except that the neutralized copolyether was omitted. The resulting polymer was ground into small particles using a Wiley mill, polymerized in the solid state at 200° C. for 9 hours, and the physical properties shown in Table 1 were measured by Test Methods 1 to 4.

Comparative Example B

The copolyester of Example 4 was prepared according to the procedure described, except that the neutralized copolyether was introduced with other reactants at the beginning of the polymerization. The resulting polymer was ground into small particles using a Wiley mill, polymerized in the solid state at 200° C. for 9 hours, and the physical properties shown in Table 1 were measured by Test Methods 1 to 4.

The results indicate that examples 2, 3, 4, and Comparative Example B showed affinity for the basic dye Servo Blue; examples 2, 3, and 4 showed basic dye receptivity and demonstrated other properties equivalent to Comparative Example A; examples 2 and 3 demonstrated that the copolyether can be added at the polycondensation or transesterification stages when using DMT; and example 4 and Comparative Example B suggested that the copolyether be added at the polycondensation stage, not at the initial esterification stage when using TPA, to avoid lowered $M_n$ and melt viscosity values and higher b values, all of which are undesirable.

TABLE 1

Properties of Examples and Comparative Examples of Polyesters

| Ex. # | Mono-mer[a] | Stage[b] | Intrinsic Viscosity[c] dl/g[ml/g] | | Mn[d] | Mw/Mn | MV[f] | MP (° C.)[g] | b*[h] |
|---|---|---|---|---|---|---|---|---|---|
| 2 | DMT | P | 0.74 [74] | 0.99 [99] | 18100 | 1.79 | 289 | 226 | 1.5 |
| 3 | DMT | T | 0.67 [67] | 1.32 [132] | 18700 | 1.51 | 726 | 224 | 1.9 |
| 4 | TPA | P | 0.72 [72] | 1.08 [108] | 20100 | 1.69 | 430 | 223 | 5.3 |
| Comparative Examples | | | | | | | | | |
| A | TPA | None[i] | 0.86 [86] | 0.95 [95] | 20400 | 2.36 | 254 | 230 | 7.8 |
| B | TPA | E | 0.72 [72] | 0.98 [98] | 12700 | 2.50 | 89 | 217 | 12.0 |

[a]Monomer; DMT: Dimethyl terephthalate. TPA: Terephthalic Acid.
[b]Stage at which Comonomer was added - P denotes polycondensation indicating the copolyether was added after the transesterification or esterification step (examples 2 and 4); T denotes transesterification indicating the copolyether was added at the beginning of the reaction sequence, before the transesterification step (example 3); and E denotes esterification indicating the copolyether was added at the beginning of the reaction sequence, before the esterification step (comparative example B; see also test).
[c]Intrisic viscosity (Test Method 3); the first column under which, was before solid state polymerization and the second column was the viscosity after solid state polymerization.
[d]Mn - number average molecular weight; Test Method 1.
[e]Mw/Mn - Mw; weight average molecular weights; Test Method 1.
[f]Melt Viscosity - 260° C./6 minute; Pa.s; Test Method 2.
[g]MP (° C.), melting point; Test Method 2.
[h]b* value is a measure of the yellowness of the polyester; Test Method 4.
[i]Comparative Example A was the polymer of terephthalic acid and 1,3-propanediol prepared without any copolyether comonomer.

What is claimed is:

1. A composition comprising repeat units derived from a diol and a sulfonated dicarboxylic acid wherein said composition is a copolyether and said diol is selected from the group consisting of a straight chain diol having 3 or 6 to 12 carbon atoms per molecule, HO—CH$_2$—CH$_{(2-n)}$(CH$_3$)$_n$—CH$_2$—OH, HO—(CH$_2$)$_3$—O—(CH$_2$)$_3$—OH, and combinations of two or more thereof; and n is 1 or 2.

2. A composition according to claim 1 wherein said diol is selected from the group consisting of 1,3-propanediol, 1,6-hexanediol, 1,8-octanediol, 1,10-decanediol, 1,12-dodecanediol, 2-methyl-1,3-propanediol, 2,2-dimethyl-1,3-propanediol, di(1,3-propylene glycol), and combinations of two or more thereof.

3. A composition according to claim 1 wherein said diol is 1,3-propanediol.

4. A composition according to claim 1, 2, or 3 wherein said sulfonated dicarboxylic acid is selected from the group consisting of aliphatic sulfonated dicarboxylic acid, aromatic sulfonated dicarboxylic acid, salts thereof, esters thereof, and combinations of two or more thereof.

5. A composition according to claim 4 wherein said sulfonated dicarboxylic acid salt is selected from the group consisting of ammonium salt, an alkali metal salt, alkaline earth metal salt, phosphonium salt, and combinations of two or more thereof.

6. A composition according to claim 4 wherein said sulfonated dicarboxylic acid is selected from the group consisting of sulfosuccinic acid, 3-(2-sulfoethyl) hexanedioic acid, sulfonated phthalic acid, sulfonated isophthalic acid, sulfonated terephthalic acid, sulfonated naphthalenic acid, salts thereof, esters thereof, and combinations of two or more thereof.

7. A composition according to claim 4 wherein said sulfonated dicarboxylic acid is 5-sulfo-isophthalic acid or combination of 5-sulfo-isophthalic acid and 5-sulfo-isophthalic acid sodium salt.

8. A composition according to claim 3 or 7 wherein the molar ratio of the repeat units derived from said sulfonated dicarboxylic acid to the repeat units derived from said diol is in the range of from about 1:5 to about 1:100.

9. A composition according to claim 8 wherein said molar ratio is in the range of from 1:10 to 1:60.

10. A composition according to claim 1, 2, or 9 wherein said composition is a copolyether having the formula of H—{[—O—R$^1$—]$_y$—O—C(O)—A(R$^2$)$_z$( SO$_3$M)—C(O) }$_c$—[—O—R$^1$—]$_x$—OH; R$^1$ is a straight chain C$_3$ or C$_{6-C12}$ alkylene group, CH$_2$—CH$_{(2-n)}$(CH$_3$)$_n$—CH$_2$, or (CH$_2$)$_3$—O—(CH$_2$)$_3$; R$^2$ is a C$_1$ to C$_4$ alkyl group; A is a hydrocarbyl group having about 1 to about 20 carbon atoms per group; M is hydrogen, an alkali metal, an alkaline earth metal, quaternary ammonium, phosphonium, or combinations of two or more thereof; n is 1 or 2; z is 0–2, inclusive, except that, when A is aliphatic, z is 0; x and y are each more than 1 and (x+y) is 4 to 50; and c is 2 to 10 or a mixture of a copolyether with c=1 with one or more copolyether having c=2–10.

11. A composition according to claim 10 wherein x, y, and c are each a number that produces the number-average molecular weight of said composition within the range of about 500–10,000.

12. A composition according to claim 1, 7, 9, or 11 wherein said composition further comprises repeat units derived from at least one acid and a second diol; said acid is a dicarboxylic acid or ester thereof; and said second diol has 2 to 12 carbon atoms per molecule.

13. A composition according to claim 12 wherein said second diol is selected from the group consisting of ethanediol, 1,3-propanediol, 1,4-butanediol, 1,4-cyclohexanedimethanol, and combinations of two or more thereof.

14. A composition according to claim 12 wherein said acid is selected from the group consisting of terephthalic acid, isophthalic acid, phthalic acid, naphthalene dicarboxylic acid, 4,4'-diphenylene dicarboxylic acids, succinic acid, adipic acid, esters thereof, and combinations of two or more thereof.

15. A composition according to claim 14 wherein said second diol is selected from the group consisting of ethanediol, 1,3-propanediol, 1,4-butanediol, 1,4-cyclohexanedimethanol, or combinations of two or more thereof.

16. A composition according to claim 13, 14, or 15 wherein said acid is terephthalic acid or dimethyl terephthalate.

17. A composition according to claim 16 wherein said second diol is 1,3-propanediol.

18. A composition comprising repeat units derived from (1) a second diol, (2) a copolyether, and (3) at least one acid wherein said second diol has 2 to 12 carbon atoms per molecule; said acid is a dicarboxylic acid, ester thereof, or combinations thereof; said dicarboxylic acid has the formula of $HO_2CA^1CO_2H$; $A^1$ is an alkylene group; said copolyether comprises repeat units derived from a first diol and a sulfonated dicarboxylic acid; said first is selected from the group consisting of a straight chain diol having 3 or 6 to 12 carbon atoms per molecule, $HO-CH_2-CH_{(2-n)}(CH_3)_n-CH_2-OH$, or $HO-(CH_2)_3-O-(CH_2)_3-OH$, and combinations of two or more thereof, and n is 1 or 2; and said sulfonated dicarboxylic acid salt is selected from the group consisting of ammonium salt, an alkali metal salt, alkaline earth metal salt, phosphonium salt, and combinations of two or more thereof.

19. A composition according to claim 18 wherein said copolyether has the formula of $H-\{[-O-R^1-]_y-O-C(O)-A(R^2)_z(SO_3M)-C(O)\}_c-[-O-R^1-]_x-OH$; $R^1$ is a straight chain $C_3$ or $C_6-C_{12}$ alkylene group, $CH_2-CH_{(2-n)}(CH_3)_n-CH_2$, or $(CH_2)_3-O-(CH_2)_3$; $R^2$ is a $C_1$ to $C_4$ alkyl group; A is a hydrocarbyl group having about 1 to about 20 carbon atoms per group; M is hydrogen, an alkali metal, an alkaline earth metal, quaternary ammonium, phosphonium, or combinations of two or more thereof; n is 1 or 2; z is 0–2, inclusive, except that, when A is aliphatic, z is 0; x and y are each more than 1 and (x+y) is 4 to 50; c is 2 to 10 or a mixture of a copolyether with c=1 with one or more copolyether having c=2–10; and x, y, and c are each a number that produces the number-average molecular weight of said copolyether within the range of 500 to 10,000.

20. A composition according to claim 18 or 19 wherein said second diol is selected from the group consisting of ethanediol, 1,3-propanediol, 1,4-butanediol, 1,4-cyclohexanedimethanol, or combinations of two or more thereof;

x, y, and c are each a number that produces the number-average molecular weight of said copolyether within the range of 500 to 2,000;

said sulfonated dicarboxylic acid is selected from the group consisting of sulfosuccinic acid, 3-(2-sulfoethyl) hexanedioic acid, sulfonated phthalic acid, sulfonated isophthalic acid, sulfonated terephthalic acid, sulfonated naphthalenic acid, salts thereof, esters thereof, and combinations of two or more thereof;

said first diol is selected from the group consisting of 1,3-propanediol, 1,6-hexanediol, 1,8-octanediol, 1,10-decanediol, 1,12-dodecanediol, 2-methyl-1,3-propanediol, 2,2-dimethyl-1,3-propanediol, di(1,3-propylene glycol), and combinations of two or more thereof; and said acid is selected from the group consisting of terephthalic acid, isophthalic acid, phthalic acid, naphthalene dicarboxylic acid, 4,4'-diphenylene dicarboxylic acids, succinic acid, adipic acid, esters thereof, and combinations of two or more thereof.

21. A composition according to claim 20 wherein said first diol is 1,3-propanediol; said second diol is 1,3-propanediol; said acid is terephthalic acid, dimethyl terephthalate, or combinations thereof; and said sulfonated dicarboxylic acid is 5-sulfo-isophthalic acid sodium salt.

22. A process comprising contacting a second diol with a copolyether and an acid wherein said second diol, said copolyether, and said acid are as recited in claim 18, 19, or 21.

23. A process comprising contacting at least one acid with a second diol to produce a intermediate and thereafter contacting said intermediate with a copolyether wherein said second diol, said copolyether, and said acid are as recited in claim 18, 19, or 21.

* * * * *